United States Patent
Cho et al.

(10) Patent No.: US 10,217,981 B2
(45) Date of Patent: Feb. 26, 2019

(54) BATTERY MODULE

(71) Applicant: SAMSUNG SDI CO., LTD., Yongin-si, Gyeonggi-do (KR)

(72) Inventors: Junwoo Cho, Yongin-si (KR); Taeyong Kim, Yongin-si (KR); Jonghan Rhee, Yongin-si (KR); Shidong Park, Yongin-si (KR); Seongjoon Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 175 days.

(21) Appl. No.: 15/056,949

(22) Filed: Feb. 29, 2016

(65) Prior Publication Data

US 2016/0268564 A1 Sep. 15, 2016

(30) Foreign Application Priority Data

Mar. 11, 2015 (KR) .................. 10-2015-0033783

(51) Int. Cl.
*H01M 2/12* (2006.01)
*H01M 2/10* (2006.01)

(52) U.S. Cl.
CPC ....... *H01M 2/1252* (2013.01); *H01M 2/1077* (2013.01); *H01M 2/1264* (2013.01); *H01M 2220/20* (2013.01)

(58) Field of Classification Search
None
See application file for complete search history.

(56) References Cited

U.S. PATENT DOCUMENTS

| 6,767,667 | B1* | 7/2004 | Ooshima | H01M 2/0202 |
| | | | | 429/162 |
| 2006/0216592 | A1* | 9/2006 | Chun | H01M 2/0404 |
| | | | | 429/175 |
| 2011/0183179 | A1* | 7/2011 | Okada | B60L 3/0046 |
| | | | | 429/120 |
| 2012/0094156 | A1* | 4/2012 | Lim | H01M 2/12 |
| | | | | 429/82 |
| 2012/0310566 | A1 | 12/2012 | Hoshino et al. | |
| 2017/0125756 | A1* | 5/2017 | Nietling | H01M 2/1077 |

FOREIGN PATENT DOCUMENTS

| JP | H07135008 | * | 5/1995 |
| JP | 2013-12464 A | | 1/2013 |
| JP | 2013-251241 A | | 12/2013 |
| WO | WO2015196046 | * | 12/2015 |

OTHER PUBLICATIONS

Machine English Translation of JPH07135008. Itou et al. May 23, 1995 (Year: 1995).*

* cited by examiner

*Primary Examiner* — Jonathan G Leong
*Assistant Examiner* — Christopher P Domone
(74) *Attorney, Agent, or Firm* — Lewis Roca Rothgerber Christie LLP

(57) ABSTRACT

A battery module includes a plurality of battery cells aligned in a first direction and a housing portion fixing the plurality of battery cells, wherein central parts of the plurality of battery cell are concave, and wherein first adhesive members are between adjacent battery cells.

11 Claims, 5 Drawing Sheets

BATTERY MODULE

CROSS-REFERENCE TO RELATED APPLICATION

This application claims priority to and the benefit of Korean Patent Application No. 10-2015-0033783, filed on Mar. 11, 2015, in the Korean Intellectual Property Office, the entire content of which is incorporated herein by reference in its entirety.

BACKGROUND

1. Field

One or more embodiments of the present invention relate to a battery module.

2. Description of the Related Art

High output battery modules using a non-aqueous electrolyte having a high energy density are being developed. Such high output battery modules are sometimes implemented by electrically coupling a plurality of battery cells so that the high output battery modules can be used for devices requiring high power. For example, the high output battery modules may be used in a motor drive in electric vehicles, and the like.

Additional components and structures need to be added to such battery modules in order to tightly hold the battery cells, and various structures for securing space in a battery module are needed. However, it is desirable to provide a structure that does not increase (or substantially increase) the weight and/or the volume of the battery module.

SUMMARY

According to one or more embodiments of the present invention, a battery module includes a plurality of battery cells aligned in a first direction and a housing portion fixing the plurality of battery cells, wherein central parts of the plurality of battery cell are concave, and wherein first adhesive members are between adjacent battery cells.

The first adhesive members may be at boundary portions of the plurality of battery cells.

The housing portion may include first and second side plates respectively located at side surfaces of the plurality of battery cells, first and second end plates respectively located at outer sides of a first battery cell and an n-th battery cell, the first and second end plates being coupled to the first and second side plates, and the first battery cell and the n-th battery cell being at opposing ends of the battery module, and a top plate located on upper surfaces of the plurality of battery cells, the top plate being coupled to upper sides of the first and second side plates.

The battery module may further include second adhesive members between the first end plate and the first battery cell and between the second end plate and the n-th battery cell, respectively.

The second adhesive members may include body portions that correspond to the first and n-th battery cells and wing portions that extend from the body portions and cover sides of the first and n-th battery cells.

The body portions of the second adhesive members may be at boundary portions of the first and n-th battery cells, respectively.

The battery module may further include first flexible members between sides of the plurality of battery cells and the first and second side plates.

Inner sides of the first and second side surface plates may include groove portions having a depth in a second direction.

The first flexible members may correspond to and may be inserted in the groove portions.

The battery module may further include a degassing portion on an upper portion of the top plate.

Each of the battery cells from among the plurality of battery cells may include a vent portion, and the top plate may have first openings that correspond to vent portions.

Second flexible members may protrude from the degassing portion, wherein each of the second flexible members has a second opening, and the second flexible members may be inserted in and coupled to the first holes.

BRIEF DESCRIPTION OF THE DRAWINGS

Example embodiments are described more fully hereinafter with reference to the accompanying drawings; however, the present invention may be embodied in different forms and should not be construed as limited to the embodiments set forth herein. Rather, these embodiments are provided so that this disclosure is thorough and complete, and to fully convey the scope of the example embodiments to those skilled in the art.

In the figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
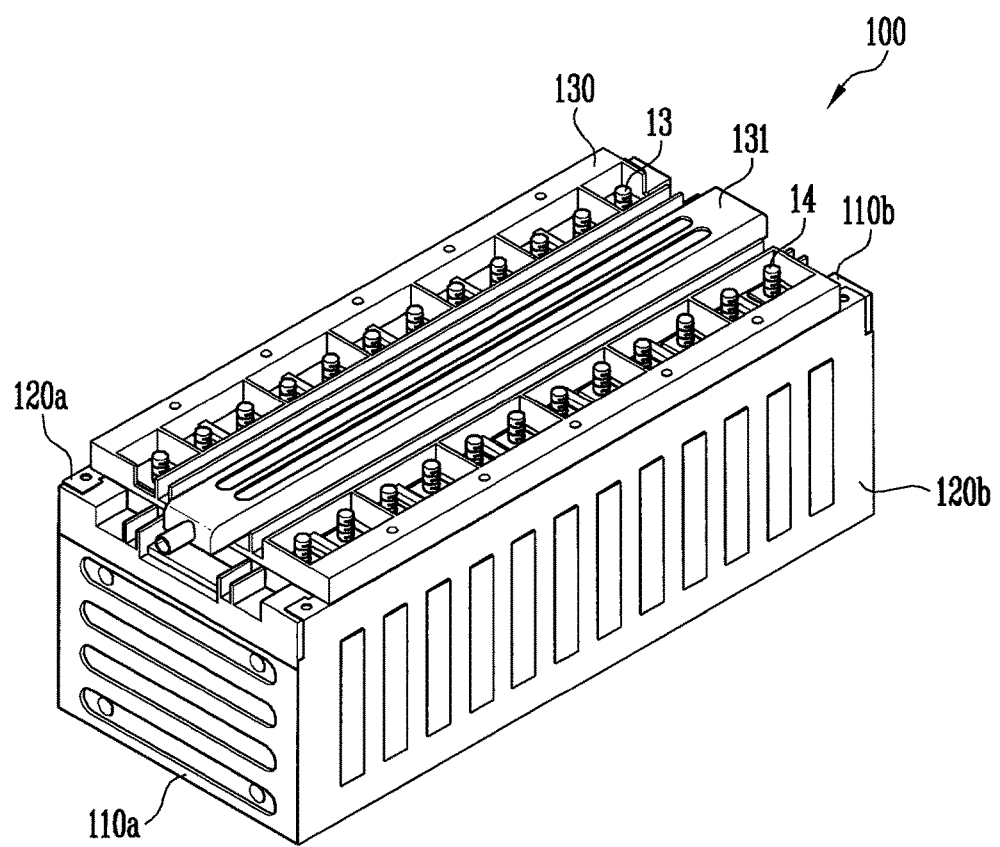
FIG. 1 is a perspective view of a battery module according to one or more exemplary embodiments of the present invention.

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, it will be understood that when an element or layer is referred to as being "on" or "coupled to" another element or layer, it can be directly on or coupled to the other element or layer or intervening elements or layers may be present. In contrast, when an element is referred to as being "directly on" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "upper" elements relative to other elements or features would then be oriented as "lower" elements relative to the other elements or features. Thus, the exemplary term "upper" can encompass both an orientation of upper and lower. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a" and "an" are intended to include the plural forms as well, unless the context clearly indicates otherwise. It will be further understood that the terms "includes," "including," "comprises," and "comprising," when used in this specification, specify the presence of stated features, integers, steps, operations, elements, and/or components, but do not preclude the presence or addition of one or more other features, integers, steps, operations, elements, components, and/or groups thereof. The use of "may" when describing embodiments of the present invention refers to "one or more embodiments of the present invention." Also, the term "exemplary" is intended to refer to an example or illustration.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
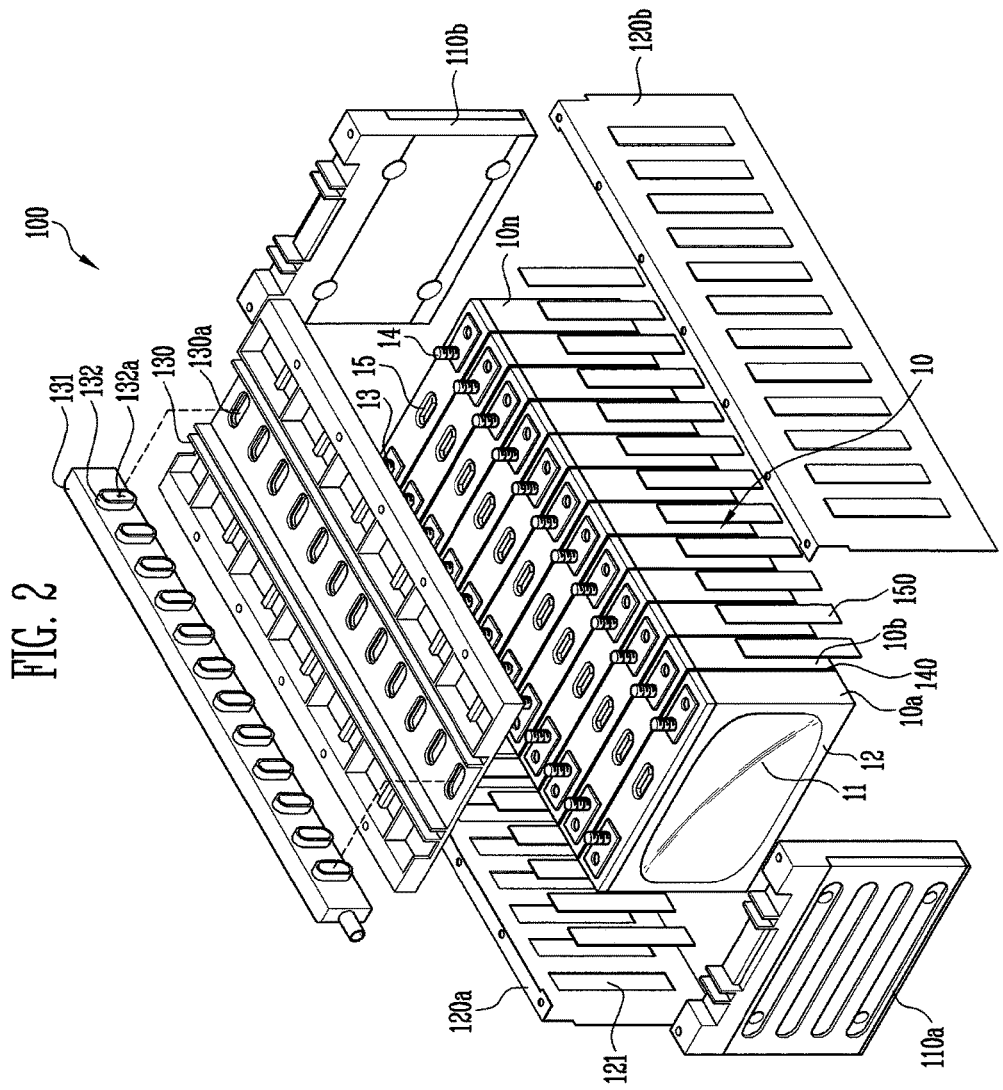
FIG. 2 is an exploded view of a battery module according to one or more exemplary embodiments of the present invention.

FIG. 1 is a perspective view of a battery module according to one or more exemplary embodiments of the present invention, and FIG. 2 is an exploded view of a battery module according to one or more exemplary embodiments of the present invention.

As shown in FIGS. 1 and 2, a battery module 100 may include a plurality of battery cells 10 aligned in a direction (e.g., a first direction) and a housing portion holding the plurality of battery cells 10. The housing portion may include first and second end plates 110a and 110b, first and second side plates 120a and 120b, and a top plate 130. Central parts 11 of the battery cells 10 may be formed concavely (i.e., may be formed toward the inside of the corresponding battery cells 10). First adhesive members 140 may be provided between adjacent battery cells 10 (e.g., between a first battery cell 10a and a second battery cell 10b).

Figure 3:
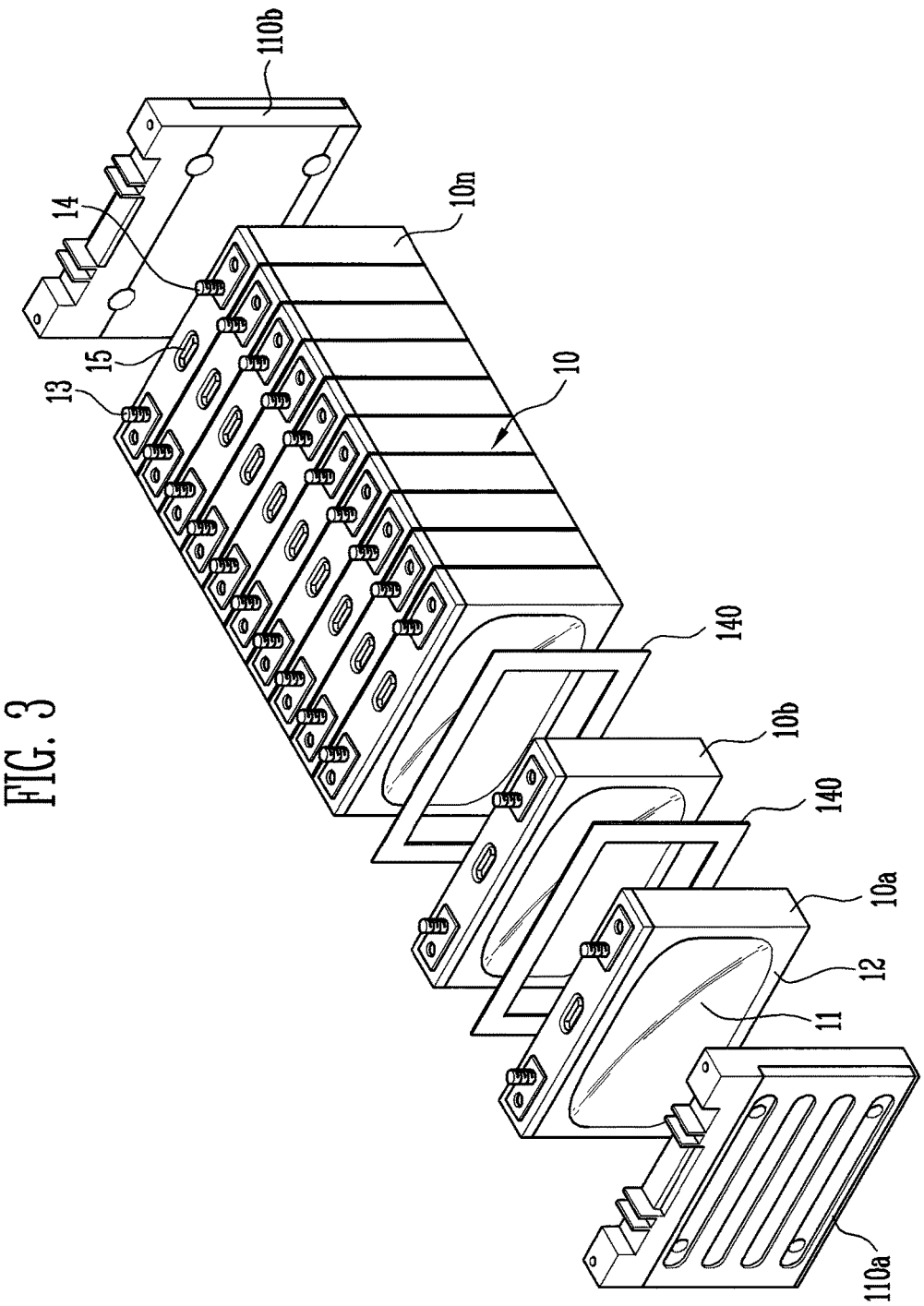
FIG. 3 is a partial exploded view of a battery module according to one or more exemplary embodiments of the present invention.

FIG. 3 is a partial exploded view of a battery module according to one or more exemplary embodiments of the present invention.

As shown in FIG. 3, the first battery cell 10a and the second battery cell 10b may be adjacent to each other and the first and second battery cells 10a and 10b may be insulated from each other by the first adhesive member 140. The central parts 11 of the corresponding first and second battery cells 10a and 10b may have a depth (e.g., a depth in the first direction) that is less than a depth of boundary portions 12 of the corresponding battery cells 10a and 10b such that a space may be secured when the battery cells 10 swell. The first battery cell 10a and the second battery cell 10b may be aligned to face each other (for example, the first battery cell 10a and the second battery cell 10b may be adjacently aligned in the first direction). The first adhesive member 140 may be provided between the first battery cell 10a and the second battery cell 10b. The first adhesive members 140 may have adhesive properties and may be formed along the boundary portions 12 to hold (or tightly hold) the first and second battery cells 10a and 10b together and to reduce (or minimize or substantially minimize) the effect of swelling in one or more of the battery cells 10. The first adhesive members 140 may be adhesives or a double-sided tape, for example.

The first adhesive members 140 may have both insulative properties and adhesive properties. The first adhesive member 140 may be provided between the first and second battery cells 10a and 10b and may contact the boundary portions 12 of the first and second battery cells 10a and 10b. The first adhesive members 140, provided between the battery cells 10, may provide insulation between the battery cells 10 and may also secure mechanical/structural performance of the battery module 100 by tightly holding the battery cells 10 together. Reliability of the battery module 100 may be enhanced by allowing space to be secured at the time of swelling of the battery cells 10.

With reference to FIGS. 1 and 2, the battery module according to one or more embodiments of the present invention is described further below.

The battery cells 10 may include a battery case, an electrode assembly received in the battery case and an electrolyte. If the electrode assembly and the electrolyte electrochemically react, energy may be generated. On one side of each battery cell 10 (e.g., an upper surface each of the battery cells 10), there may be terminal portions 13 and 14 that are electrically coupled to the electrode assembly, and a vent that may provide a passage to discharge gas that is generated inside of the corresponding battery cell 10. For example, in one or more embodiments, the terminal portions 13 and 14 may be terminals having different polarities, e.g., a positive terminal 13 and a negative terminal 14.

The plurality of battery cells 10 may be aligned (e.g., may be aligned in the first direction) such that wide surfaces of the battery cells 10 face each other. The first adhesive members 140 may be provided between the aligned plurality of battery cells 10. The plurality of battery cells 10 may be fixed by the housing. The housing may include the first end plate 110a facing the wide surface of the first battery cell 10a and the second end plate 110b facing the wide surface of the n-th battery cell 10n. The first battery cell 10a and the n-th battery cell 10n may be at opposing edges of the aligned battery cells 10 (e.g., may be the outermost battery cells 10 of the battery module 100). The housing may also include the first and second side plates 120a and 120b that couple the first and second end plates 110a and 110b, and the top plate 130 that may be coupled to top sides of the first and second side plates 120a and 120b.

The first and second side plates 120a and 120b may support the sides of the battery cells 10 and may extend in the first direction. First flexible members 150 may be provided between the sides of the battery cells 10 and the first and second side plates 120a and 120b. For example, in one or more embodiments, groove portions 121 having a depth (e.g., a predetermined depth in a second direction perpendicular to the first direction) may be formed at inner sides of the first and second side plates 120a and 120b. The first flexible members 150 may be formed to correspond to the groove portions 121 and may be inserted into the groove portions 121. The first flexible members 150 may be made of rubber materials. The first flexible members 150 may reduce or minimize the likelihood of damage to the battery cells 10 due to an external shock and/or vibration.

The top plate 130 may be coupled to the top sides of the first and second side plates 120a and 120b and may be located on the upper surfaces of the plurality of battery cells 10. A degassing portion 131 may be provided on an upper portion (or an upper part) of the top plate 130. First openings (or first holes or first grooves) 130a may be formed at the top plate 130 at locations that correspond to the vent portions 15 of the battery cells 10. The degassing portion 131 may cover the first holes 130a. The degassing portion 131 may include second flexible members 132 where second flexible openings (or second flexible holes) 132a are formed at locations corresponding to the first holes 130a of the top plate 130.

In one or more embodiments, for example, the battery cells 10 may include positive terminals 13 made of aluminum and negative terminals 14 made of copper. The top plate 130 may be located on the upper surface of the battery cells 10. The vent portions 15, the first holes 130a of the top plate 130 and the second holes 132a of the second flexible members 132 may be aligned in a vertical direction (e.g., a third direction) perpendicular to the first and second directions. The protruding second flexible members 132 may be inserted into and may be coupled to the first holes 130a. Gas and dust generated by the battery cells 10 may be discharged to outside of the battery module 100 via the vent portions 15, the first holes 130a and the second holes 132a.

The first and second end plates 110a and 110b, the first and second side plates 120a and 120b and the top plate 130 may be coupled by bolts or welding.

Figure 4A:
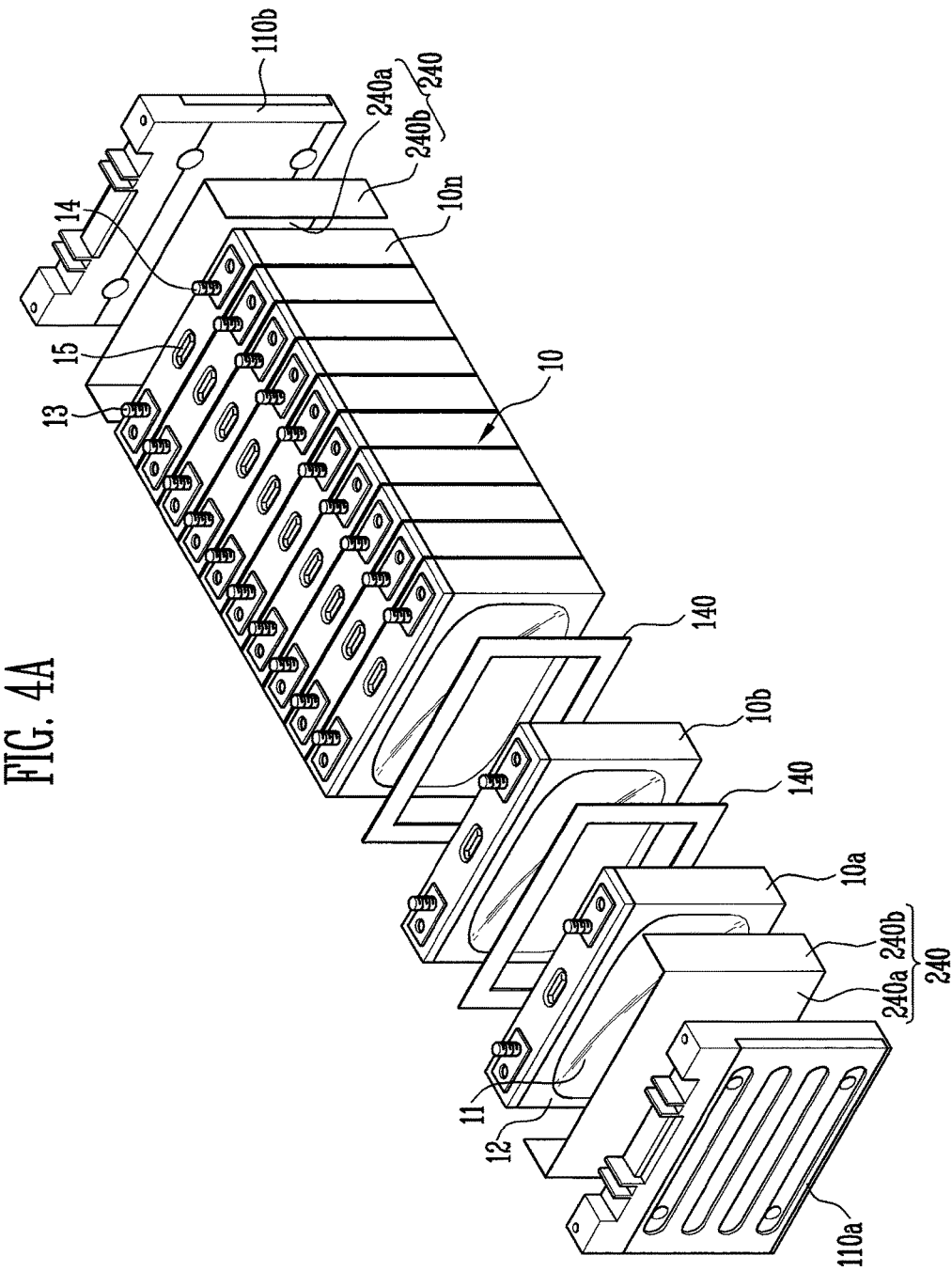
FIG. 4A is an exploded view of a battery module according to one or more exemplary embodiments of the present invention.

FIG. 4A is an exploded view of a battery module according to one or more exemplary embodiments of the present invention.

As shown in FIG. 4A, a plurality of battery cells 10 may be aligned in a direction (e.g., a first direction) such that wide areas of the battery cells 10 face each other. First adhesive members 140 may be provided between the aligned battery cells 10. A first battery cell 10a and an n-th battery cell 10n may be at opposite ends of the aligned battery cells 10. A second insulating member 240 may be provided between the first battery cell 10a and the first end plate 110a, and another second insulating member 240 may be provided between the n-th battery cell 10n and the second end plate. The second insulating members 240 may include body portions 240a that correspond to the first and n-th battery cells 10a and 10n and wing portions 240b that cover side surfaces of the first and n-th battery cells 10a and 10n and extend from the body portions 240a.

The second adhesive members 240 may provide insulation between the first and n-th battery cells 10a and 10n and the first and second end plates 110a and 110b, respectively, and may also insulate edge portions of the first and n-th battery cells 10a and 10n. The first and n-th battery cells 10a and 10n may be tightly fixed by the second adhesive members 240 having insulative and adhesive properties. Because the first and n-th battery cells 10a and 10n are physically fixed by the second adhesive members 240, the first and n-th battery cells 10a and 10n do not move around easily due to an external shock, and stability of the battery module 100 may be improved. In addition, because additional structures that hold or fix the battery cells 10 are not needed, the battery module 100 may be simplified and may also be relatively light weight.

Figure 4B:
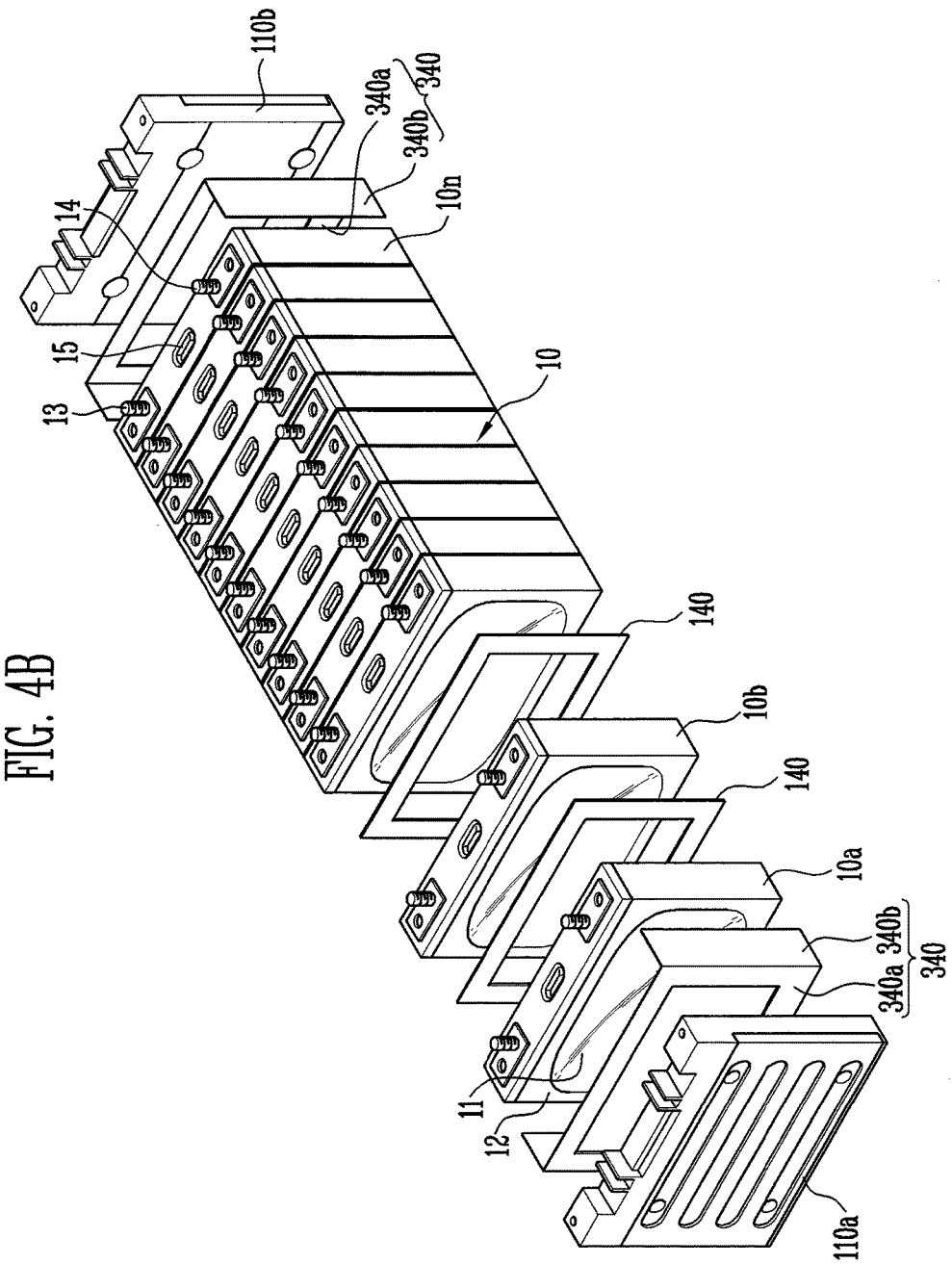
FIG. 4B is an exploded view of a battery module according to one or more exemplary embodiments of the present invention.

FIG. 4B is an exploded view of a battery module according to one or more exemplary embodiments of the present invention.

As shown in FIG. 4B, second insulating members 340 according to one or more exemplary embodiments may include body portions 340a formed along boundary portions 12 of first and n-th battery cells 10a and 10n and wing portions 340b that extend from the body portions 340a and cover or substantially cover side surfaces of the first and n-th battery cells 10a and 10n.

Because the body portions 340a of the second insulating members 340 are adjacent to the corresponding boundary portions 12 of the first and n-th battery cells 10a and 10n, it may be possible to prevent or substantially prevent the battery module 100 from increasing in overall size and/or shape, even after one or more of the battery cells 10 swell, thereby improving or substantially improving stability of the battery module 100.

Example embodiments have been disclosed herein, and although specific terms are employed, they are used and should be interpreted in a generic and descriptive sense only and are not intended to be limiting. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. A battery module comprising:
   a plurality of battery cells aligned in a first direction; and
   a housing portion fixing the plurality of battery cells,
   wherein central parts of the plurality of battery cells are concave such that a concave part of one of the plurality of battery cells faces the central part of an adjacent one of the battery cells along the first direction, and
   wherein first adhesive members are between adjacent ones of the battery cells, the first adhesive members being located at boundary portions of the plurality of battery cells and defining an opening that corresponds to the concave parts of the plurality of battery cells.

2. The battery module of claim 1, wherein the housing portion comprises:
   first and second side plates respectively located at side surfaces of the plurality of battery cells;
   first and second end plates respectively located at outer sides of a first battery cell and an n-th battery cell from among the plurality of battery cells, the first and second end plates being coupled to the first and second side plates, and the first battery cell and the n-th battery cell being at opposing ends of the battery module; and a top plate located on upper surfaces of the plurality of battery cells, the top plate being coupled to upper sides of the first and second side plates.

3. The battery module of claim 2, further comprising second adhesive members between the first end plate and the first battery cell and between the second end plate and the n-th battery cell, respectively.

4. The battery module of claim 3, wherein the second adhesive members comprise:
body portions that correspond to the first and n-th battery cells; and
wing portions that extend from the body portions and cover sides of the first and n-th battery cells.

5. The battery module of claim 4, wherein the body portions of the second adhesive members are at boundary portions of the first and n-th battery cells, respectively.

6. The battery module of claim 2, further comprising first flexible members between sides of the plurality of battery cells and the first and second side plates.

7. The battery module of claim 6, wherein inner sides of the first and second side surface plates comprise groove portions having a depth in a second direction.

8. The battery module of claim 7, wherein the first flexible members correspond to and are inserted in the groove portions.

9. The battery module of claim 2, further comprising a degassing portion on an upper portion of the top plate.

10. The battery module of claim 9, wherein each of the battery cells from among the plurality of battery cells comprises a vent portion, and wherein the top plate has first openings that correspond to the vent portions.

11. The battery module of claim 10, further comprising second flexible members protruding from the degassing portion, each of the second flexible members having a second opening, and wherein the second flexible members are inserted in and coupled to the first openings.

* * * * *